Dec. 31, 1946.   J. J. BLACK   2,413,404
KNOCK-DOWN CHASSIS FOR TRAILERS
Filed Nov. 19, 1943   2 Sheets-Sheet 2
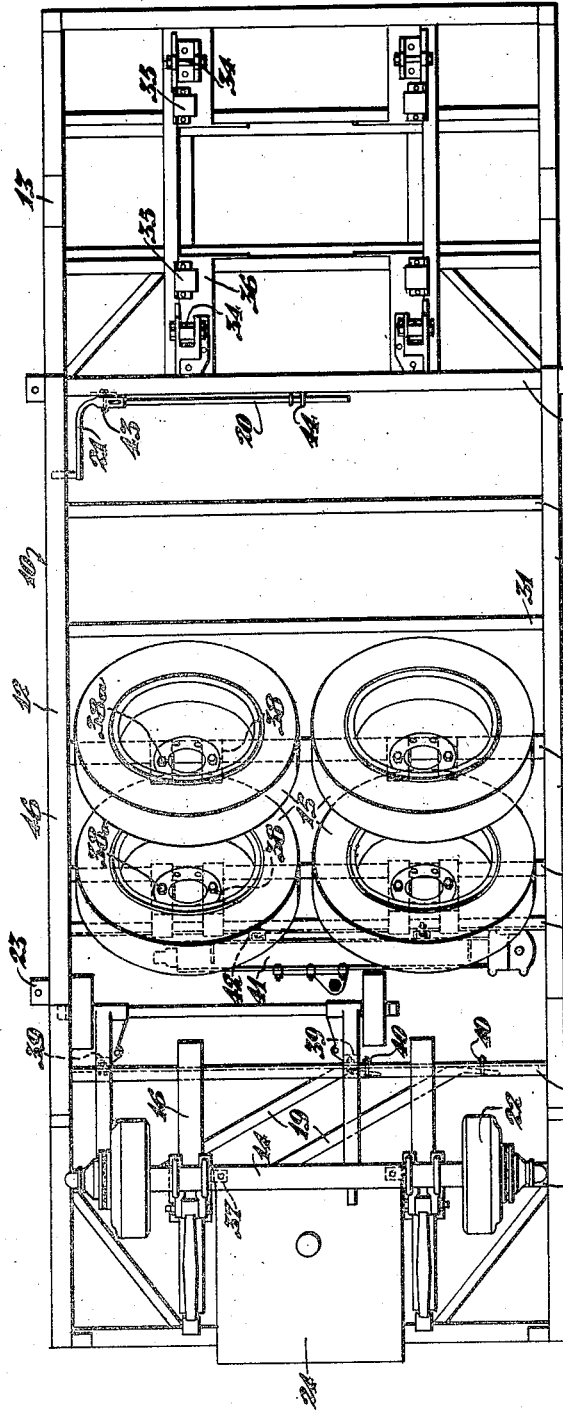
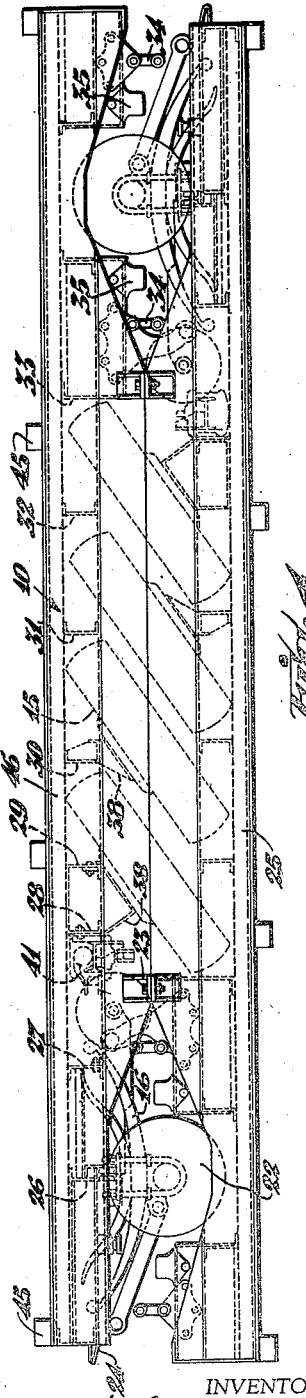
INVENTOR.
James J. Black
BY Wood, Arey, Herron & Evans
Attorneys Patented Dec. 31, 1946

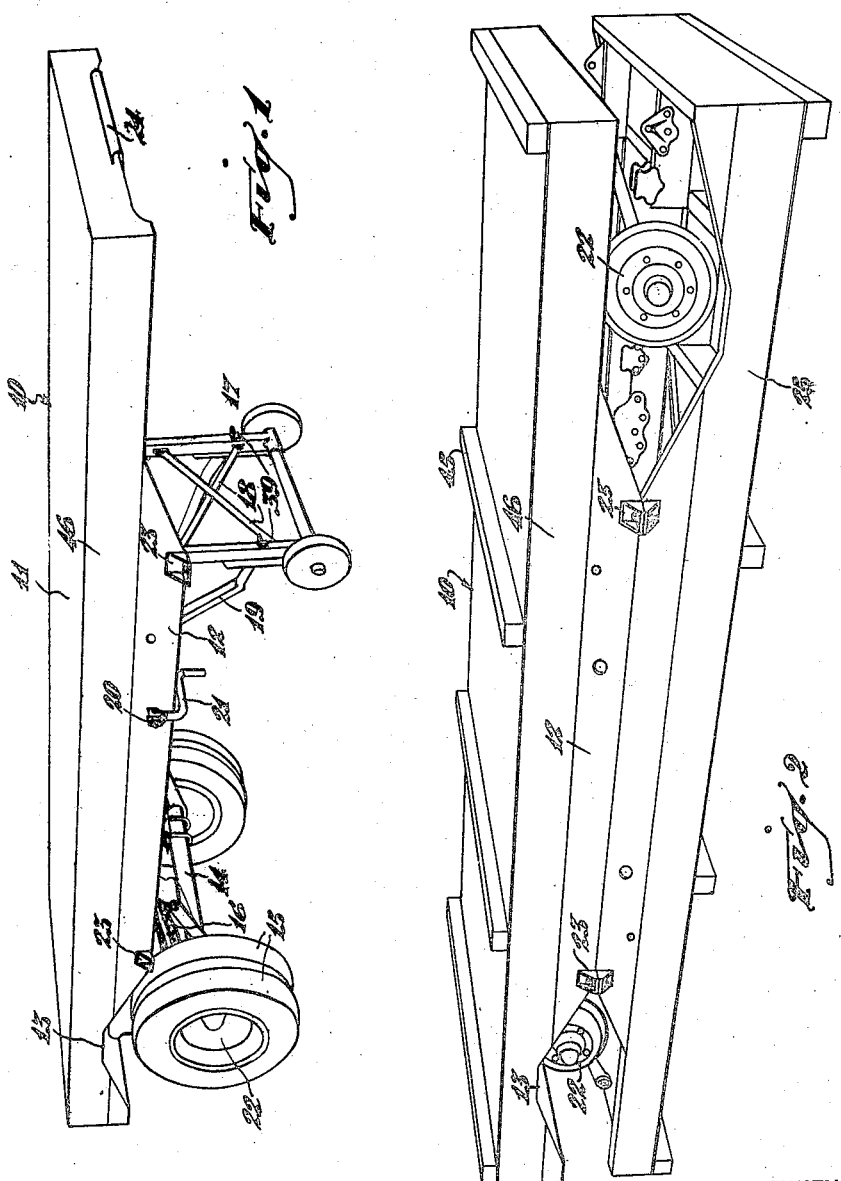

2,413,404

UNITED STATES PATENT OFFICE 2,413,404

KNOCKDOWN CHASSIS FOR TRAILERS

James J. Black, Cincinnati, Ohio, assignor to The Trailmobile Company, Cincinnati, Ohio, a corporation of Delaware Application November 19, 1943, Serial No. 510,947

1 Claim. (Cl. 206—46)

This invention relates to a chassis for road vehicles of the semi-trailer type and is particularly concerned with a chassis in which the component parts are of such nature and construction that they may be readily packaged into a compact unit for shipment to some distant point. The invention also contemplates the assembly of a pair of chassis of similar or identical construction and their component parts into a compact shipping unit which unit is strongly constructed, devoid of exterior projections and substantially smaller in bulk than the two vehicles to which the parts relate when these vehicles are in an assembled state.

In my copending application Serial No. 501,654, filed September 9, 1943, Patent No. 2,382,376, August 14, 1945, I have disclosed and claimed a body for a semi-trailer which body can be quickly knocked down or dis-assembled for shipment, packed so as to occupy a minimum of shipping space and, after the point of destination has been reached, reassembled quickly and conveniently into its original form. The invention of the present application deals with a similar problem except that it concerns the chassis of the vehicle rather than the body. In the preferred embodiment which will be hereinafter described, I have disclosed a chassis of a type adapted to be utilized in conjunction with the semi-trailer body of my copending application. However, the inventions are independent and in each instance the structure disclosed may be utilized with a different type of chassis or body as the case may be and not necessarily one having the same characteristics of ready disassembly and packaging for shipment.

Under ordinary circumstances where it is desired to move a road vehicle such as a semi-trailer from one point to another the vehicle is constructed in its final form at the factory and then moved by road or rail to the destination point. However, under particular conditions such as are occasioned by the need for shipment of a large number of units of similar or identical construction to points overseas, the space occupied by the assembled vehicles while in transit tends to become a critical factor. Particularly this is true where the vehicles must be transported by ship and when available shipping space is limited as is the case at the present time. In order to meet this problem the present invention contemplates provision of a shipping unit formed from a pair of semi-trailer chassis and their component elements which unit can be prepared at the factory and from there shipped in packaged form to its ultimate destination where it can be reassembled into a pair of completed chassis.

This being the primary object of the invention, to accomplish the desired result, another object of the invention has been to so construct the platform of the chassis to permit it to be joined with another similar platform so as to provide a combined unit having a comparatively smooth exterior surface devoid of projections.

Another object has been to so construct and arrange the undersides of the two mating platforms to provide space for the storage during shipment of the various component elements of the chassis such as the axles, tires and props.

Another object has been the provision of means for securing the two platforms together and means for securing the component elements to the respective chassis to which they belong to prevent loss or damage during shipment and to facilitate easy reassembly.

Other and further objects and advantages will be apparent from a consideration of the further and more detailed description of the invention when considered in conjunction with the drawings in which:

Figure 1 represents a perspective view of a chassis of the type with which the preferred embodiment of the invention is concerned, fully assembled, as will be the case after it arrives at its point of destination.

Figure 2 represents a perspective view of a shipping unit formed from two chassis, in this case of identical construction, and their component parts.

Figure 3 is a bottom plan view of a single chassis platform with the component parts stored and secured in position prior to the attachment of the second corresponding unit to form the completed package as illustrated in Figure 2.

Figure 4 is a side elevational view of the two units joined together, the positioning of the component parts being illustrated in dotted lines.

The assembled semi-trailer 10 as shown in Figure 1 is of relatively conventional construction. A horizontal platform 11 is provided for the positioning of a body of any desired type. Side wall extensions 12 depend from the platform side rail elements 46 on each side of the vehicle, a cut-out space 13 being provided at the rear to avoid interference with the rotation of the wheels. The side rail elements 46 extend substantially completely along the sides of the platform and depend therefrom for a uniform distance on each side. The side wall extensions are terminated forwardly at points just beyond the center of the platform and just beyond the prop uprights, as illustrated in Figure 1.

An axle 14 to which four tired wheels 15 are secured is positioned at the rear of the platform and secured in position in the conventional way. Springs 16 are disposed between the axle and the underside of the platform. A retractable prop unit 17 comprising vertical legs, axles, and wheels depends from the platform toward the front thereof. Prop braces 18 are stretched diagonally between the legs on the inner sides and maintain the rigidity of the legs when the prop is in load supporting position. Leg supports 19 extend rearwardly, one from each leg, and are joined to the prop operative mechanism on the underside of the platform in a manner which is not disclosed in the drawings but which is conventional in the art. A prop crank shaft 20 extends laterally across the body from one side extension to the other, a crank handle 21 being pivotally and detachably secured to an end thereof.

Of the other elements shown in Figure 1, 22 are the wheel hubs to which the tires 15 are secured, 23 are spaced brackets secured to the side wall extension 12 along its lower edges and 24 is a fifth wheel plate of conventional construction.

The second chassis of the pair is, as previously stated, preferably of identical construction with that of the first and has been designated generally as 25 (see Figure 2). Since the component elements associated with this second chassis are all identical with those of the first chassis, they will not be identified by separate numbers and this is not necessary to provide a clear comprehension of the invention.

In the view of the underside of the platform as it appears in Figure 3, it will be noted that the frame includes side rails 46 at the extreme outer edges. This construction is essential to the invention as, in the type of construction which utilizes a center frame plus an outside frame, the longitudinal rails of the center frame prevent the disposition of the tires in the manner hereinafter described. A plurality of channel shaped members numbered respectively 26, 27, 28, 29, 30, 31, 32 and 33 extend laterally across the platform on the underside. These members are secured to the side walls and form ribs or bracing elements for the platform. They are also utilized in conjunction with the arrangement provided for the storage and attachment of the component elements of the chassis when the latter are arranged in shipping position.

In preparing the chassis parts for packaging, the platform of the first chassis is placed underside-up as shown in Figure 3 and the spring shackles 34 and spring stops 35 are firmly secured in their appropriate positions on longitudinal vertical brace members 36. The axle 14, which with the wheel hubs 22 and spring 16 forms an assembled unit, is positioned toward the front end of the platform directly behind the fifth wheel plate 24 and there secured into position by attachment elements passed through the brackets 37. These brackets are secured to the rib 26 as shown in dotted lines in Figure 4. The four tires used for each vehicle are disposed centrally on the under side of the platform in a diagonal position and are secured to brackets 38 by the attachment elements 38a. These brackets are in turn secured to the ribs 28, 29, and 30. The prop unit 17 is disposed toward the front of the platform and secured to the channel 27 through the brackets 39. These brackets are an integral part of the prop as shown in Figure 1. The leg supports 19 are also disposed toward the front of the platform in a diagonal position and secured to the channel 27 by the attachment elements 40. The prop operating mechanism 41 is secured to the rib 28 by means of the brackets 42 which are also integrally secured to the body of the element. The prop shaft 20 and crank 21 are secured to the channel 33 at two points by the bolt 43 and clip 44.

It will be noted that the disposition of the larger elements toward the interior front of the platform leaves the inner rear end of the platform comparatively clear. This provides sufficient space for the positioning of the corresponding elements on the second chassis when the platform of that chassis is turned reversely, that is, with its front end toward the rear end of the first chassis. The positioning of the axle, spring and hub assembly toward the front, as indicated, is particularly important because in this way with the tires removed and the springs removed from the shackles it is possible to dispose this assembly closely adjacent to the underside of the platform in a much less obtrusive position than would be the case if the assembly were disposed toward the rear in its normal position. The diagonal arrangement of the tires is also very important because in this position the maximum of the available space is utilized and, as illustrated, there is ample room for the positioning of eight tires. The means of attachment of the component elements to the underside of the platform is simple yet particularly effective. When secured in this way they will maintain their positions during shipment and there is no possibility of loss or breakage. When it is desired to assemble the chassis at the point of destination the attachment means may be removed and the elements of both chassis are ready at hand for assembly.

After the component elements have been disposed on each of the two platforms in the manner illustrated in Figure 3, one platform may be positioned over the other as shown in Figure 4 and the two secured together by passing attachment elements through the brackets 23. In this way a complete packaged unit ready for shipment is formed. The unit is completely devoid of external projections, may be handled with ease, and occupies a minimum of shipping space. If desired, cleats 45 may be removably secured to the upper and lower sides to strengthen the unit and to protect the surfaces of the platforms.

Although the invention has been described as having a specific application to semi-trailers it may also be utilized in connection with four-wheel trailers and in this instance there is, of course, no need of providing for the disposition of the prop elements.

Having described my invention, I claim:

A shipping unit formed from the component elements of two complete trailer chassis, said elements including in the case of each chassis a platform having a substantially flat upper surface and side and end rail elements depending from said upper surface at the sides and ends thereof and side rail extension elements disposed along the side rail elements medially thereof, the two platforms being secured together along the edges of the side wall extension elements with the undersides of the platforms facing each other and the rear end of one platform toward the front end of the other, said chassis therefore forming a substantially rectangular unit substantially devoid of exterior projections, reenforcing ribs on the undersides of the platforms, units comprising the axles and springs of each chassis secured to the underside of each platform at the front end thereof and within the storage space constituted by the platforms and side rails, prop elements likewise secured to the undersides of the platforms, and wheel and tire assemblies secured to the reenforcing ribs of the respective platforms, said wheel and tire assemblies being disposed diagonally relative to and athwart the plane of contact of the side rail extension elements of the respective platforms.

JAMES J. BLACK.